US008745174B2

(12) United States Patent
Bryan et al.

(10) Patent No.: US 8,745,174 B2
(45) Date of Patent: Jun. 3, 2014

(54) THIN CLIENT FOR MAPPING SYSTEM (75) Inventors: John S. Bryan, Fort Wayne, IN (US); Brett E. Meyer, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 146 days.

(21) Appl. No.: 13/540,678

(22) Filed: Jul. 3, 2012

(65) Prior Publication Data
US 2014/0012951 A1   Jan. 9, 2014

(51) Int. Cl.
*G06F 15/16*   (2006.01)
(52) U.S. Cl.
USPC ........... 709/219; 709/201; 709/203; 701/409; 345/418
(58) Field of Classification Search
USPC .................. 709/201–203, 217–227; 701/409; 345/418, 419, 619
See application file for complete search history.

(56) References Cited

U.S. PATENT DOCUMENTS

| 6,477,526 | B2* | 11/2002 | Hayashi et al. | 701/532 |
|---|---|---|---|---|
| 8,032,584 | B2* | 10/2011 | Appleton et al. | 709/201 |
| 8,483,947 | B2* | 7/2013 | Johnson et al. | 701/409 |
| 2002/0059296 | A1* | 5/2002 | Hayashi et al. | 707/104.1 |
| 2002/0133569 | A1 | 9/2002 | Huang et al. | |
| 2004/0078139 | A1 | 4/2004 | Kornhauser et al. | |
| 2004/0157641 | A1 | 8/2004 | Chithambaram et al. | |
| 2006/0058949 | A1 | 3/2006 | Fogel et al. | |
| 2008/0043037 | A1 | 2/2008 | Carroll | |
| 2008/0228697 | A1* | 9/2008 | Adya et al. | 707/2 |
| 2008/0268822 | A1* | 10/2008 | Johnson et al. | 455/414.2 |
| 2008/0301643 | A1* | 12/2008 | Appleton et al. | 717/124 |
| 2010/0125552 | A1 | 5/2010 | Peterson et al. | |
| 2010/0223551 | A1* | 9/2010 | Twig et al. | 715/712 |
| 2011/0187741 | A1* | 8/2011 | Akiya et al. | 345/625 |
| 2011/0286664 | A1 | 11/2011 | Bryan et al. | |
| 2012/0066296 | A1* | 3/2012 | Appleton et al. | 709/203 |
| 2012/0072467 | A1 | 3/2012 | Kiraly et al. | |
| 2012/0130638 | A1* | 5/2012 | Uyama et al. | 701/533 |
| 2012/0204089 | A1* | 8/2012 | Boudreau et al. | 715/205 |
| 2012/0270563 | A1* | 10/2012 | Sayed | 455/456.3 |

FOREIGN PATENT DOCUMENTS

EP   1207669 A2   5/2002

OTHER PUBLICATIONS

PCT/US2013/038976; International Filing Date May 1, 2013; Notification of Transmittal of The International Search Report and The Written Opinion of the International Searching Authority, or the Declaration dated Nov. 1, 2013; pp. 1-7.
Lerner, et al., "Sensor-to-Shooter C2ISR Integration with Joint Battlespace Inforsphere: JBI Client Adapters" Jan. 2006; pp. 1-35.
PCT/US2013/038976; International Filing Date May 1, 2013; Written Opinion of the International Searching Authority dated Nov. 1, 2013; pp. 1-6.

\* cited by examiner

*Primary Examiner* — Moustafa M Meky
(74) *Attorney, Agent, or Firm* — Cantor Colburn LLP (57) ABSTRACT

A method of operating a thin client in a mapping system includes receiving, by the thin client, a map adapter from a map server; loading the map adapter in the thin client, wherein the loaded map adapter comprises a map engine; receiving, by the thin client, map data from the map server; and displaying, by the thin client, the map data in the map engine in the map adapter.

20 Claims, 7 Drawing Sheets

THIN CLIENT FOR MAPPING SYSTEM

BACKGROUND

The present disclosure relates generally to mapping systems and, more particularly, to a mapping system including a thin client.

Map data is used in a wide variety of applications, including military applications, cartography, remote sending, land surveying, public utility management, natural resource management, geography, urban planning, emergency management, navigation, and localized searched engines. Different applications may require that the map data may be displayed in a format that is tailored for the particular application, and the interactions between the user and the map data may also vary based on the application. There are large variations of mapping requirements between different applications. Various map engines may be developed for displaying of map data for differing mapping applications. However, adding, replacing, and updating a map engine in a mapping system may be difficult and cost-prohibitive, as relatively complex, map engine-specific code may be required on the client side for each map engine.

SUMMARY

In an exemplary embodiment, a method of operating a thin client in a mapping system includes receiving, by the thin client, a map adapter from a map server; loading the map adapter in the thin client, wherein the loaded map adapter includes a map engine; receiving, by the thin client, map data from the map server; and displaying, by the thin client, the map data in the map engine in the map adapter.

In another embodiment, a computer program product comprising a computer readable storage medium containing computer code that, when executed by a computer, implements a method for operating a thin client in a mapping system, wherein the method includes receiving, by the thin client, a map adapter from a map server; loading the map adapter in the thin client, wherein the loaded map adapter includes a map engine; receiving, by the thin client, map data from the map server; and displaying, by the thin client, the map data in the map engine in the map adapter.

In yet another embodiment, a mapping system includes a thin client configured to: receive a map adapter from a map server; load the map adapter, wherein the loaded map adapter includes a map engine; receive map data from the map server; and display the map data in the map engine in the map adapter.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments of a mapping system including a thin client, and methods of using a mapping system including a thin client, are provided, with exemplary embodiments being discussed in detail. A thin client is a computer or a computer program which depends on another computer (i.e., a server, such as a map server) to fulfill its computational roles. This stands in contrast to a thick client that comprises a computer and computer program designed to perform these roles by itself. The thin client supports display of multiple web-based maps through a common interface, such as a web browser. The thin client interacts with a map sever that hosts a plurality of map adapters, each of the plurality of map adapters corresponding to a different mapping engine. A particular map adapter may be provided to the thin client by the map server via, for example, a uniform resource locator (URL). A user of the thin client may load a desired map adapter in the thin client via the URL, and then load map data from the map server into a map engine in the loaded map adapter. Changes and additions to the various map adapters in the map server may be made on the map server, such that neither the map server or the thin client require restarting in order to add a new map adapter or change an existing map adapter. The thin client therefore provides runtime, plug-and-play map engines, giving improved performance and increased development speed, with decreased maintenance time for the mapping system. The thin client supports multiple technologies for map adapters (for example, Adobe Flex™ or JavaScript) and multiple symbology (i.e., map decoration data) sets for map display, and also provides common interface for user interactions with various maps, such as drawing on the map and measurement tools. Advanced field artillery tactical data system (AFATDS) general map interface (GMI) alignment and reuse are supported; the common set of objects in AFATDS allows control of the heterogeneous mapping engines by the thin client.

The map server comprises a web server that hosts multiple map adapters that may be loaded in the thin client. The map adapters may be accessible by, for example, respective URLs. The various map adapters may comprise any appropriate type of map engine, such as 2-dimensional and/or 3-dimensional map engines, in various embodiments. The thin client, which may be located on a remote computer, initially requests one or more map adapters based on, for example, preferences, privileges, and/or capabilities of a user of the thin client. The map server returns the requested map adapter URL(s), which the thin client then uses to select, retrieve, and load a particular map adapter in the thin client as the client map adapter. A thin client for a mapping system may be implemented using Adobe Flex™ and Flash or Javascript in various embodiments, with cross-browser support. ActionScript or JavaScript may be used for data types and interfaces in some embodiments. The map adapter is responsible for only one instance of a specific map engine at a time, and is the sole location of map engine API usage. Java classes on the map server may be associated with ActionScript class bindings for communication between the map server and the thin client; BlazeDS & ActionScript Message Format (AMF) may be used in some embodiments. In addition, new map adapters may be loaded on the map server and made available to the thin client without the need to restart either the map server or the thin client.

Figure 1:
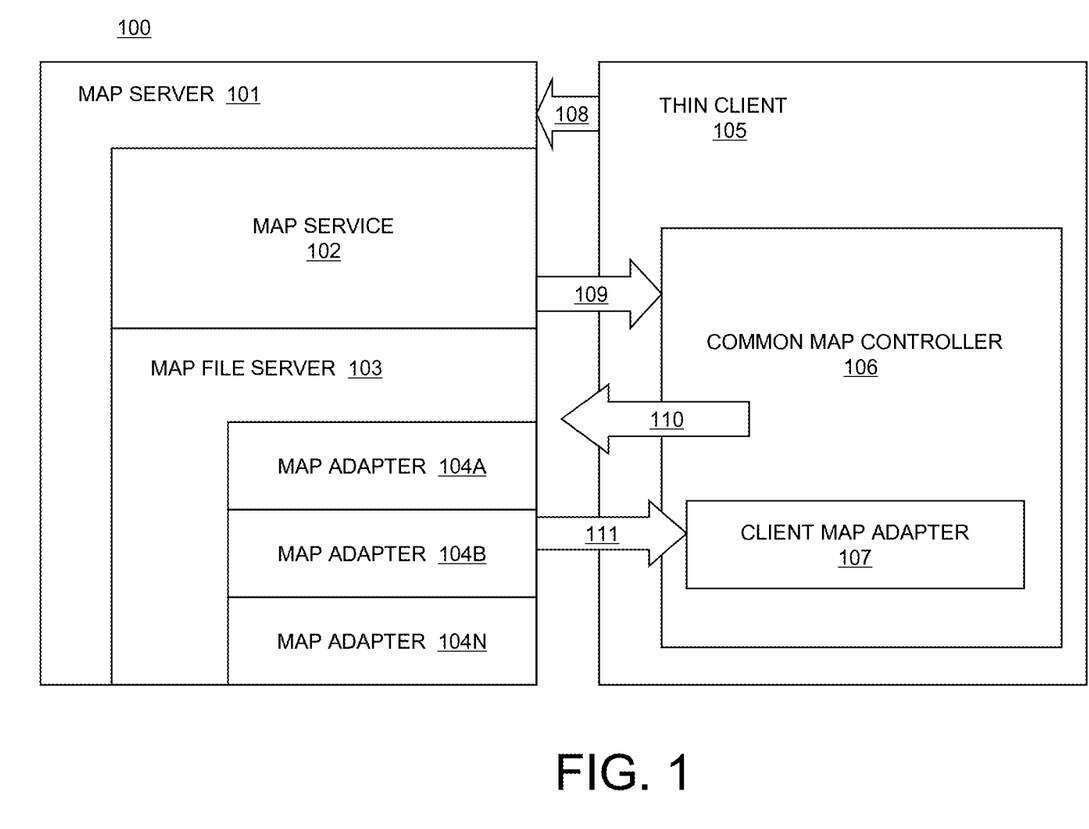
FIG. 1 is a schematic diagram of an embodiment of a mapping system including a thin client.

FIG. 1 shows an embodiment of a mapping system 100 including a map server 101 and a thin client 105. The map server 101 and the thin client 105 may be located on the same computer in some embodiments, or on different computers that are connected by an appropriate communications medium in other embodiments. The map server 101 includes a map service 102, and a map file server 103 that holds a plurality of map adapters 104A-N. Map adapters 104A-N may each correspond to a different mapping engine; there may be any appropriate number of map adapters stored in a file server such as map file server 103 on map server 101, and the individual map adapters 104A-N may be of any appropriate type, for example, 2- or 3 dimensional. Each of the map adapters 104A-N may have a respective URL that may be used to access the map adapters 104A-N. The thin client 105 includes a common map controller 106 that loads a client map adapter 107 from the map file server 103. The client map adapter 107 may correspond to any of map adapters 104A-N in map file server 103.

Figure 2:
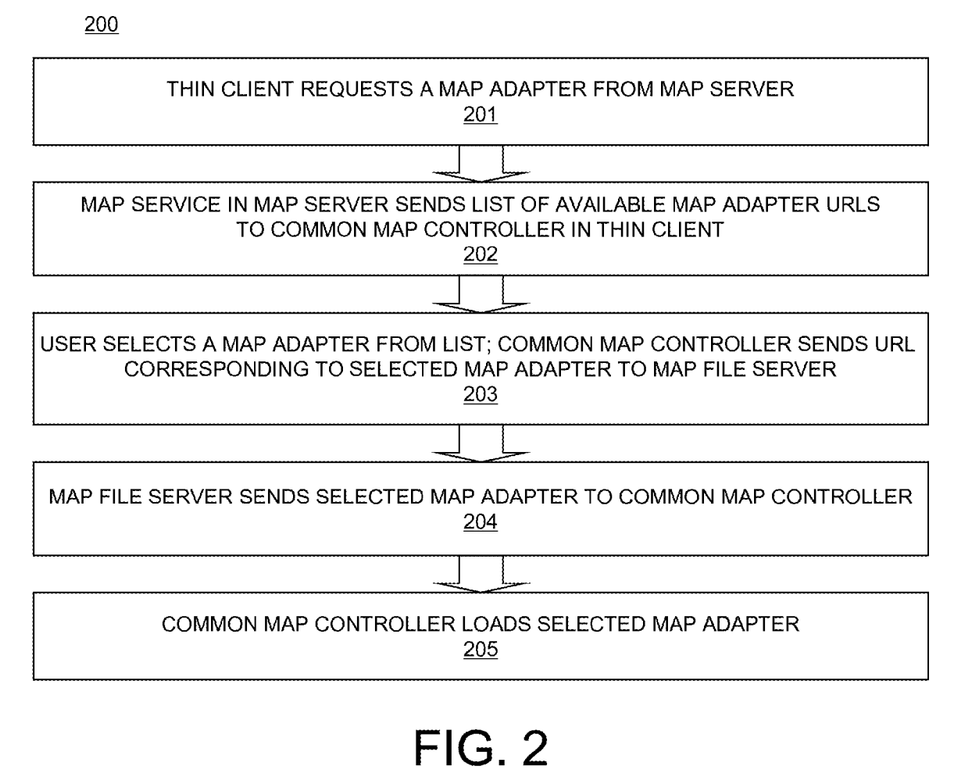
FIG. 2 is a flow diagram illustrating a method of loading a map adapter from a map server into the thin client of FIG. 1, in accordance with an exemplary embodiment.

Interactions between map server 101 and the thin client 105 are described with respect to FIG. 2, which shows a flowchart of a method 200 of loading a map adapter from a map server into a thin client. First, in block 201 of FIG. 2, the thin client 105 sends a request 108 to the map server 101 for a map adapter. The request 108 that is sent in block 201 of FIG. 2 may include user credentials of a user that is using the thin client 105. The request 108 may be sent at any point during operation of the thin client 105, including but not limited to startup. Flow of method 200 then proceeds to block 202, in which the map service 102 determines a list of one or more URLs corresponding to one or more of map adapters 104A-N, and sends the one or more URLs 109 to the common map controller 106 in the thin client 105. The one or more URLs 109 may be determined by the map service 102 based on the user credentials that were included in the request 108 in some embodiments. Flow of method 200 then proceeds to block 203, in which the user selects a particular map adapter from the one or more URLs 109, and the common map controller 106 sends a map adapter request 110 comprising the URL corresponding to the selected map adapter to the map file server 103. In some embodiments, the thin client 105 may present the user with a list of available map adapters corresponding to the one or more URLs 109, such that the user may select particular desired map adapter from the list. Method 200 then proceeds to block 204, in which the map file server 103 sends the selected map adapter 111, which comprises one of map adapters 104A-N, corresponding to the URL sent in the map adapter request 110, to the common map controller 106. Lastly, the selected map adapter 111 is then loaded in the common map controller 106 as client map adapter 107 in block 205 of method 200 of FIG. 2. During the flow of method 200 of FIG. 2, neither the map server 101 nor the thin client 105 need to be restarted.

Figure 3:
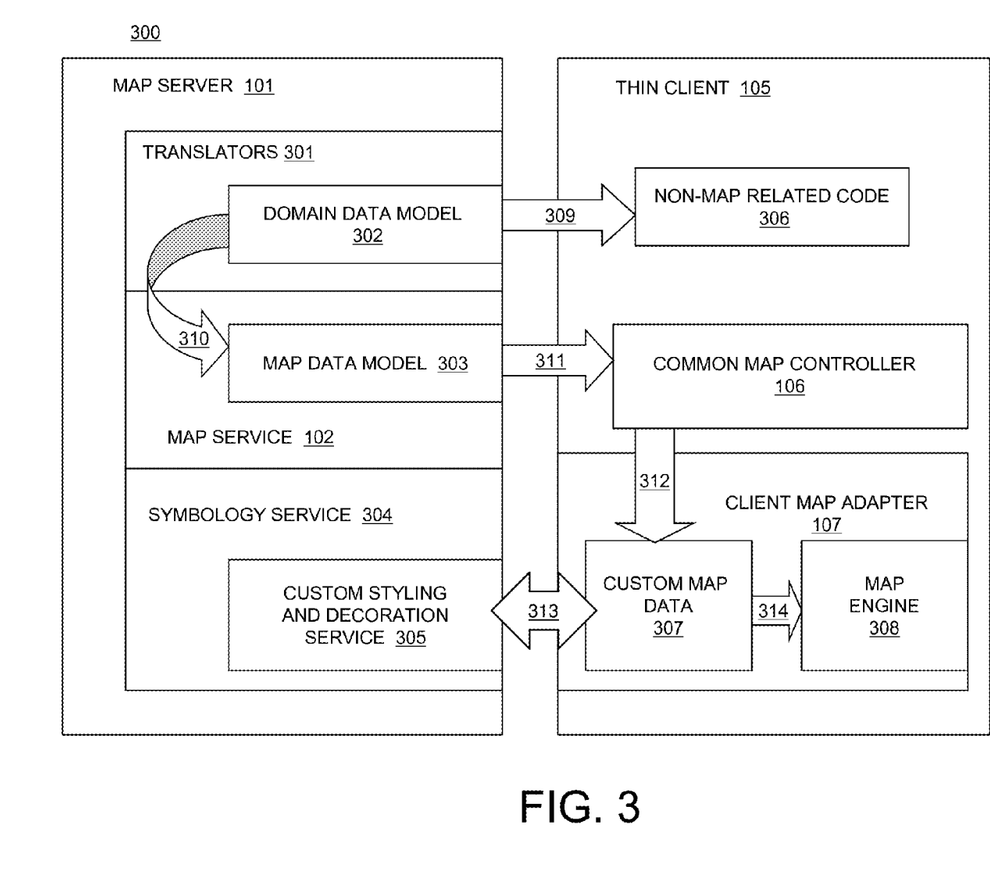
FIG. 3 is a schematic diagram of another embodiment of a mapping system including a thin client.

The client map adapter 107 may load and display map data to the user in a map engine in the client map adapter 107, and allow the user to interact with the map data via the map engine. However, different mapping applications may require different symbology to be applied to map data for display of the map data. FIG. 3 shows an embodiment of a mapping system 300 corresponding to mapping system 100 that was shown in FIG. 1, including map server 101 and thin client 105, with additional symbology functionality. In addition to the various components 102-104 and 106-107 that were shown in FIG. 1, map server 101 includes translator 301, domain data model 302, map data model 303, symbology service 304, and custom styling and decoration service 305; and thin client 105 includes non-map related code module 306, custom map data 307, and map engine 308. The domain data model 302 in the map server contains objects that relate to business logic for the various map adapters. Translators 301 are registered with the map server 101; the translators 301 are responsible for translating domain objects in to map items. These map items are placed in map data model 303, which comprises a shared cache of map items, such as icons, lines, shapes, and/or colors. The map data model 303 is based on AFATDS GMI, and is therefore map adapter independent and may be used in conjunction any type of map adapter, such as 2- and 3-dimensional map adapters. Data that is not related to mapping is sent by the domain data model 302 to the a non-map related code module 306 in the thin client 105, which retrieves the needed map items from the map data model 303 and passes the map items into the client map adapter 107. The client map adapter stores the map items in custom map data 307, which comprises a local cache of map items. Before display of the map items in map engine 308, some map items may be sent back to the map server 101 by the client map adapter 107 for decoration based on user preferences, user privileges, tactical or military specifications, and map adapter capabilities. For example, a line on a map may appear in various different ways depending on the tactical purpose or military meaning of the map. The client map adapter 107 stores the custom map data 307 and makes calls into the application programming interface (API) of the map engine 308 to display the map to a user, and to allow the user to interact with the map.

Figure 4:
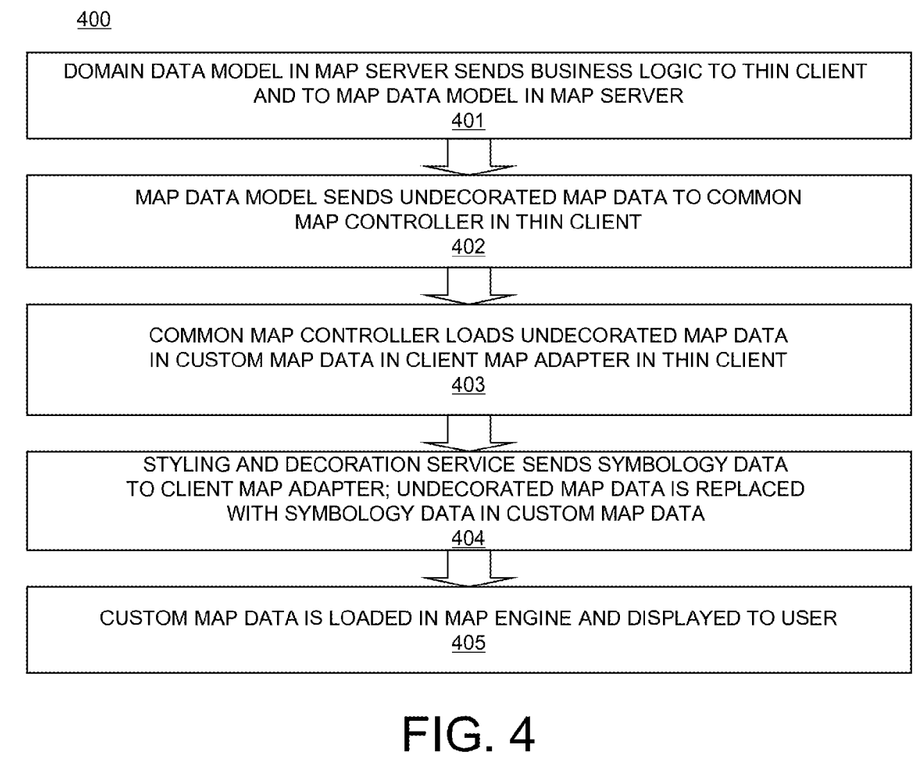
FIG. 4 is a flow diagram illustrating a method of decorating map data in the mapping system of FIG. 3, in accordance with an exemplary embodiment

Decoration of map data that is displayed in the client map adapter in the thin client is discussed in further detail with respect to FIG. 4, which shows a flowchart of a method 400 for decorating map data in the mapping system 100. First, in block 401, the domain data model 302 sends business logic 309 to the non-map related code module 306 in the thin client 105, and also sends map items 310 to the map data model 303 in the map service 102 in the map server 101. Flow then proceeds to block 402 of method 400, in which the map data model 303 sends map items 311 to the common map controller 106 in the thin client 105. Next, in block 403 of method 400, the common map controller 106 sends undecorated map data 312 in client map adapter 107; the undecorated map data 312 comprises the map items 311. The undecorated map data 312 is stored in custom map data 307. Flow then proceeds to block 404 of method 400, in which the custom styling and decoration service 305 in symbology service 304 provides symbology data 313 to client map adapter 107 for some or all of the undecorated map data 312 that is stored in custom map data 307. The symbology data 313 is decorated map data that replaces some or all of the undecorated map data 312 in custom map data 307. The symbology for a particular map is determined by symbology service 304 in conjunction with custom styling and decoration service 305, as appropriate. Map decoration and symbology, such as is performed by symbology service 304 in conjunction with custom styling and decoration service 305, may be performed as is described in U.S. patent application Ser. No. 12/784,048 (Bryan et al.), "Providing a Symbol", filed on May 20, 2010, which is herein incorporated by reference in its entirety. Lastly, in block 405 of FIG. 4, the map engine 308 loads the custom map data 307, resulting in a decorated map that is displayed to the user via map engine 308. The user may then interact with the decorated map in any appropriate manner via the map engine 308. The map engine 308 may display the map to the user via a web browser in some embodiments.

Figure 5:
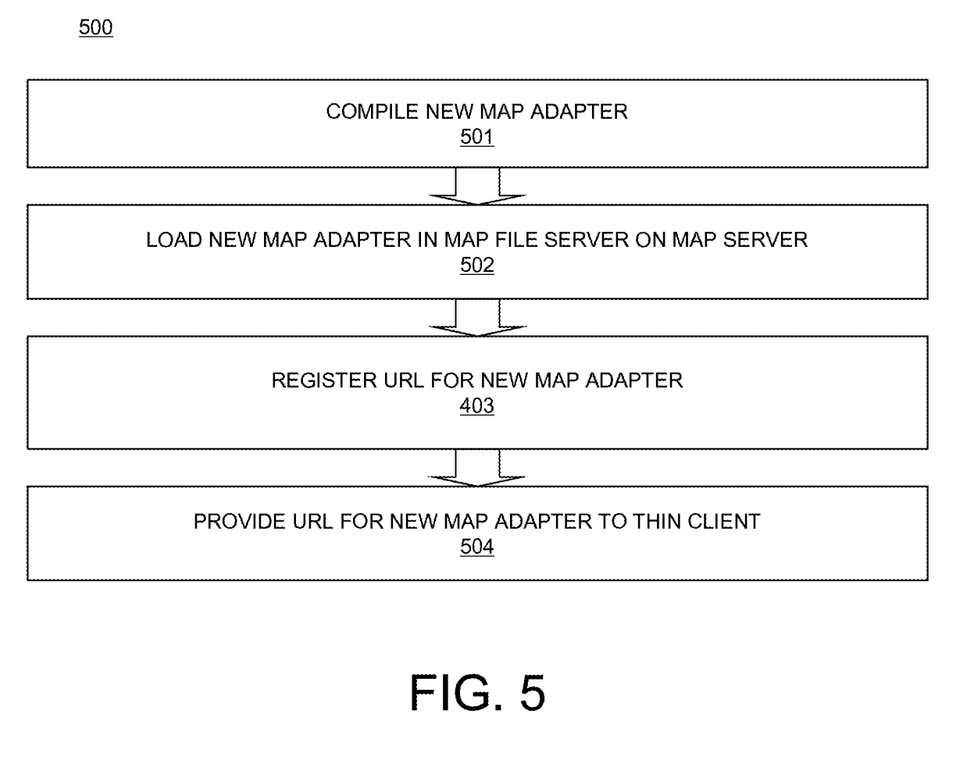
FIG. 5 is a flow diagram illustrating a method of adding a map adapter to a map server in a mapping system including a thin client, in accordance with an exemplary embodiment.

FIG. 5 shows a flowchart of a method 500 for runtime map adapter installation in a mapping system that includes a thin client. Method 500 is discussed with reference to mapping system 100 that is shown in FIG. 1. First, in block 501 of method 500, a new map adapter, or a modified version of an existing map adapter, is compiled. Next, in block 502, the binaries of the compiled map adapter are loaded in the map file server 103 in the server 101. The compiled map adapter is now one of map adapters 104A-N as are shown in FIG. 1. Flow then proceeds to block 503, in which a URL for the loaded map adapter is registered by the map service 102. Lastly, in block 504, the URL that was registered in block 503 is provided to a thin client 105 in response to a request for a map adapter. The newly compiled map adapter may then be loaded in the thin client 105 as is described in method 200 of FIG. 2. Neither the thin client 105 nor the server 101 needs to be restarted during the flow of method 500 of FIG. 5, allowing addition and modification of map adapters 104A-N in mapping system 100 to be performed without disruption to the user of the thin client 105.

Figure 6:
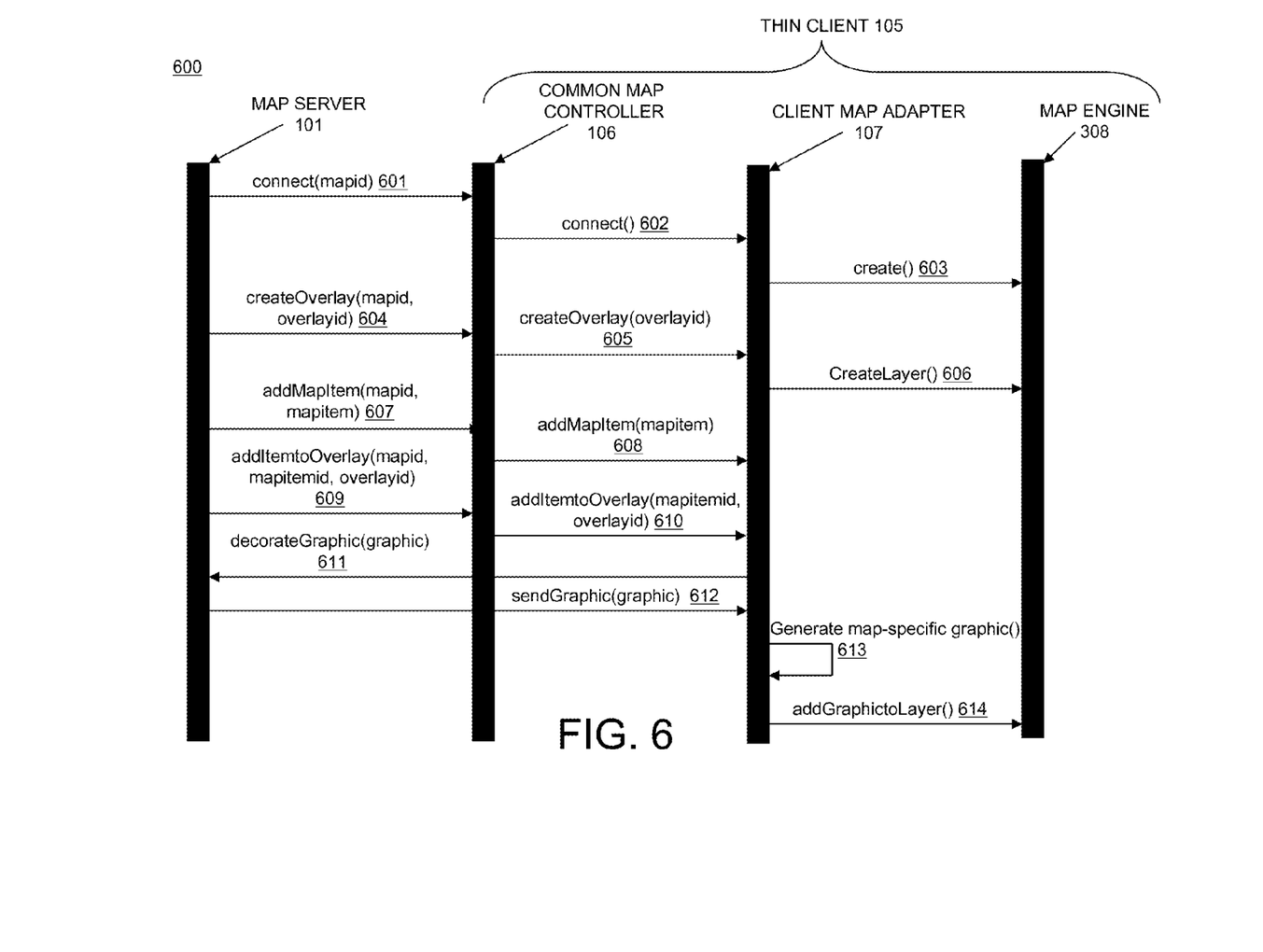
FIG. 6 is a diagram showing interactions between a map server and thin client for loading a map from the map server into a map engine on the thin client, in accordance with an exemplary embodiment.

FIG. 6 is a diagram showing exemplary interactions between a map server and thin client in a mapping system 600 for loading a map from the map server into a map engine on the thin client. Mapping system 600 may correspond to mapping system 100 that is shown in FIGS. 1 and 3. Mapping system 600 includes a map server 101, and thin client 105 including a common map controller 106, client map adapter 107, and a map engine 308. The common map controller 106 acts as a mediator for instances of map interfaces, allowing the simultaneous control of multiple map views in the map engine 605. The client map adapter 107 acts as an interface between the common map controller 106 and the map engine 308; the client map adapter 107 contains all necessary map engine-specific code. First, as is shown in FIG. 6, a map is created in the thin client 105, via commands 601-603. The map server 101 sends a connect request 601 with a map identifier to the common map controller 106. The common map controller then sends connect request 602 to the client map adapter 107, which then creates the map in the map engine 308 via creation request 603.

Next, a layer is then added to the map via commands 604-606. The map server 101 sends a create overlay request 604, with the map identifier and an overlay identifier, to the common map controller 106. The common map controller 106 then sends a create overlay request 605 to the client map adapter 107 with the overlay identifier, and the client map adapter 107 sends create layer request 606 to the map engine 308 to create a map layer in the map based on the overlay identifier. A plurality of layers may be created in the map by repeating commands 604-606 with different overlay identifiers in some embodiments.

Next, map items are provided to the client map adapter 107 via commands 607-608. First the map server 101 sends a request 607 to add a map item with the map identifier and the map item to the common map controller 106, which sends the map item 608 to the client map adapter 107. A plurality of map items may be provided from the map server 101 to the client map adapter 107 by repeating commands 607 and 608 with different map items in some embodiments.

The map item(s) in the client map adapter 107 are then added to the layer(s) of the map in the map engine 308 via commands 609-610. The map server 101 sends request 609 to the common map controller 106 to add a map item to a particular layer in the map, with the map identifier, the map item identifier and the overlay identifier. The common map controller 106 then sends request 610 to add the specified map item to the specified map layer to the client map adapter 107. Commands 609 and 610 may be repeated as often as necessary; a single map item may be added to multiple layers in a single map, and a single layer in the map may have any appropriate number of map items added to it. At this point, the client map adapter 107 has undecorated map data comprising the location of the various map items in the map.

The client map adapter 107 then sends a decoration request 611 to the map server 101 and receives response 612 from the map server 101; this may be required for some types of map items in the map, and decoration request 611 and response 612 may be repeated as often as needed for the various map items. The client map adapter 107 then generates the map-specific graphics for display of the map via command 613; command 613 may be repeated for each instance of each map item in the map. These graphics are then provided to the map engine 308 for display of the map via display command 614.

Figure 7:
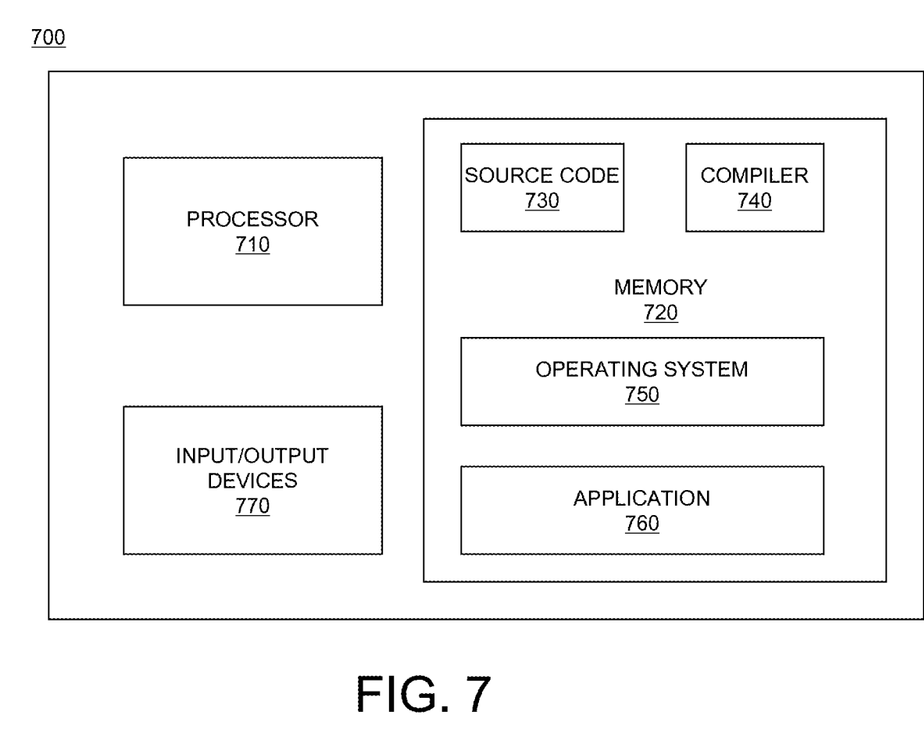
FIG. 7 is a schematic diagram of a computer that may be used in conjunction with embodiments of a mapping system including a thin client.

FIG. 7 illustrates an example of a computer 700 which may be utilized by exemplary embodiments of a mapping system including a thin client as embodied in software. Various operations discussed above may utilize the capabilities of the computer 700. One or more of the capabilities of the computer 700 may be incorporated in any element, module, application, and/or component discussed herein.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 760 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include a mapping system including a thin client for viewing of and interaction with map data, the mapping system having the ability to add or modify map adapters in a map server that is associated with the thin client without disruption to the client.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of operating a thin client in a mapping system, the method comprising:

receiving, by the thin client, a map adapter from a map server;

loading the map adapter in the thin client, wherein the loaded map adapter includes a map engine;

receiving, by the thin client, map data from the map server; and displaying, by the thin client, the map data in the map engine in the map adapter.

2. The method of claim 1, wherein the thin client comprises a first computer, and the map server comprises a second computer, and wherein the thin client and the map server support advanced field artillery tactical data system (AFATDS) general map interface (GMI) alignment.

3. The method of claim 1, wherein the map server comprises a map file server, and the map file server comprises a plurality of map adapters, and wherein receiving the map adapter from the map server comprises:

requesting, by the thin client, a list of available map adapters from the map server;

receiving, by the thin client, the list of available map adapters from the map server, wherein the list of available map adapters comprises a subset of the plurality of map adapters that comprise the map file server;

determining, by the thin client, a selected map adapter from the list of available map adapters;

requesting, by the thin client, the selected map adapter from the map file server; and receiving, by the thin client, the selected map adapter from the map file server.

4. The method of claim 3, wherein the list of available map adapters comprises a list of uniform resource locators (URLs) corresponding to the subset of the plurality of map adapters that comprise the map file server, and wherein requesting the selected map adapter comprises sending a URL corresponding to the selected map adapter to the map file server.

5. The method of claim 1, wherein receiving map data by the thin client from the map server comprises:

receiving, by the thin client, undecorated map data from the map server; and receiving, by the thin client, symbology data corresponding to the undecorated map data from the map server.

6. The method of claim 5, wherein displaying the map data in the map engine in the map adapter comprises:

replacing, by the thin client, at least a portion of the undecorated map data with the symbology data, and displaying, by the thin client, the symbology data in the map engine.

7. The method of claim 1, further comprising:

loading, by the map server, a new map adapter in a map file server of the map server;

registering, by the map server, a URL corresponding to the new map adapter by the map server; and providing, by the map server, the registered URL to the thin client in response to a request for a list of available map adapters from the thin client.

8. A computer program product comprising a computer readable storage medium containing computer code that, when executed by a computer, implements a method for operating a thin client in a mapping system, wherein the method comprises:

receiving, by the thin client, a map adapter from a map server;

loading the map adapter in the thin client, wherein the loaded map adapter comprises a map engine;

receiving, by the thin client, map data from the map server; and displaying, by the thin client, the map data in the map engine in the map adapter.

9. The computer program product according to claim 8, wherein the thin client comprises a first computer, and the map server comprises a second computer, and wherein the thin client and the map server support advanced field artillery tactical data system (AFATDS) general map interface (GMI) alignment.

10. The computer program product according to claim 8, wherein the map server comprises a map file server, and the map file server comprises a plurality of map adapters, and wherein receiving the map adapter from the map server comprises:

requesting, by the thin client, a list of available map adapters from the map server;

receiving, by the thin client, the list of available map adapters from the map server, wherein the list of available map adapters comprises a subset of the plurality of map adapters that comprise the map file server;

determining, by the thin client, a selected map adapter from the list of available map adapters;

requesting, by the thin client, the selected map adapter from the map file server; and receiving, by the thin client, the selected map adapter from the map file server.

11. The computer program product according to claim 10, wherein the list of available map adapters comprises a list of uniform resource locators (URLs) corresponding to the subset of the plurality of map adapters that comprise the map file server, and wherein requesting the selected map adapter comprises sending a URL corresponding to the selected map adapter to the map file server.

12. The computer program product according to claim 8, wherein receiving map data by the thin client from the map server comprises:

receiving, by the thin client, undecorated map data from the map server; and receiving, by the thin client, symbology data corresponding to the undecorated map data from the map server.

13. The computer program product according to claim 12, wherein displaying the map data in the map engine in the map adapter comprises:

replacing, by the thin client, at least a portion of the undecorated map data with the symbology data, and displaying, by the thin client, the symbology data in the map engine.

14. The computer program product according to claim 8, further comprising:

loading, by the map server, a new map adapter in a map file server of the map server;

registering, by the map server, a URL corresponding to the new map adapter by the map server; and providing, by the map server, the registered URL to the thin client in response to a request for a list of available map adapters from the thin client.

15. A mapping system comprising:

a thin client configured to:

receive a map adapter from a map server;

load the map adapter, wherein the loaded map adapter comprises a map engine;

receive map data from the map server; and display the map data in the map engine in the map adapter.

16. The mapping system of claim 15, wherein the thin client comprises a first computer, and the map server comprises a second computer, and wherein the thin client and the map server support advanced field artillery tactical data system (AFATDS) general map interface (GMI) alignment.

17. The mapping system of claim 15, wherein the map server comprises a map file server, and the map file server comprises a plurality of map adapters, and wherein the thin client is configured to receive the map adapter from the map server by:

requesting a list of available map adapters from the map server;

receiving the list of available map adapters from the map server, wherein the list of available map adapters comprises a subset of the plurality of map adapters that comprise the map file server;

determining a selected map adapter from the list of available map adapters;

requesting the selected map adapter from the map file server; and receiving the selected map adapter from the map file server.

18. The mapping system of claim 17, wherein the list of available map adapters comprises a list of uniform resource locators (URLs) corresponding to the subset of the plurality of map adapters that comprise the map file server, and wherein requesting the selected map adapter comprises sending a URL corresponding to the selected map adapter to the map file server.

19. The mapping system of claim 15, wherein the thin client is configured to receive map data from the map server and display the map data in the map engine in the map adapter by:

receiving undecorated map data from the map server; and receiving symbology data corresponding to the undecorated map data from the map server;

replacing, by the thin client, at least a portion of the undecorated map data with the symbology data, and displaying, by the thin client, the symbology data in the map engine.

20. The mapping system of claim 15, wherein the map server is configured to:

load a new map adapter in a map file server of the map server;

register a URL corresponding to the new map adapter by the map server; and provide the registered URL to the thin client in response to a request for a list of available map adapters from the thin client.

* * * * *